United States Patent
Habib et al.

(10) Patent No.: US 12,456,858 B2
(45) Date of Patent: Oct. 28, 2025

(54) SYSTEMS AND A METHOD FOR FAULT PROTECTION OF SELECTIVELY ISLANDED MICROGRIDS

(71) Applicant: ABB Schweiz AG, Baden (CH)

(72) Inventors: Hany Fawzy Kamel Habib, Glen Allen, VA (US); Thomas Anthony Kendzia, III, Rockville, VA (US); Veerakumar Bose, Henrico, VA (US); Christopher Alan Belcastro, Mechanicsville, VA (US)

(73) Assignee: ABB Schweiz AG, Baden (CH)

( * ) Notice: Subject to any disclaimer, the term of this patent is extended or adjusted under 35 U.S.C. 154(b) by 284 days.

(21) Appl. No.: 18/448,221

(22) Filed: Aug. 11, 2023

(65) Prior Publication Data

US 2025/0055274 A1 Feb. 13, 2025

(51) Int. Cl.
*H02H 7/22* (2006.01)
*H02H 1/00* (2006.01)

(52) U.S. Cl.
CPC ............ *H02H 7/22* (2013.01); *H02H 1/0007* (2013.01)

(58) Field of Classification Search
CPC .......... H02H 7/22; H02H 1/0007; H02H 3/05; H02H 7/26; H02J 13/0004; H02J 3/001; H02J 3/381; H02J 3/388
See application file for complete search history.

(56) References Cited

U.S. PATENT DOCUMENTS

| | | | |
|---|---|---|---|
| 10,269,509 B1 * | 4/2019 | Habib | H02J 3/32 |
| 11,205,892 B2 * | 12/2021 | Alibert | H02H 7/263 |
| 11,532,932 B2 * | 12/2022 | Alibert | H02J 13/0004 |
| 2019/0237283 A1 | 8/2019 | Pabst et al. | |
| 2020/0044436 A1 | 2/2020 | Alibert et al. | |
| 2024/0322555 A1 * | 9/2024 | Sun | H02H 7/22 |

OTHER PUBLICATIONS

Patnaik et al., AC microgrid protection—A review: Current and future prospective. Applied Energy. 2020;271:115210, 28 pages.
European Search Report for Application No. 24193065.0, dated Feb. 18, 2025, 5 pages.

\* cited by examiner

*Primary Examiner* — Danny Nguyen
*Assistant Examiner* — Nicolas Bellido
(74) *Attorney, Agent, or Firm* — McCarter & English, LLP

(57) ABSTRACT

In one aspect, a controller for managing electrical faults in a microgrid is provided. The microgrid includes electrical loads, electrical sources, and circuit protection devices that selectively couple the electrical loads and the electrical sources with each other. The controller comprises at least one processor configured to direct a grid tie switch to open to electrically isolate the microgrid from an electric grid, determine, in response to directing the grid tie switch to open, that an electrical fault exits in the microgrid, and determine whether a fault current of the electrical fault is less than a threshold value. The at least one processor is further configured to direct the grid tie switch to close to electrically connect the microgrid to the electric grid and increase the fault current above the threshold value in response to determining that the fault current is less than the threshold value.

20 Claims, 7 Drawing Sheets

SYSTEMS AND A METHOD FOR FAULT PROTECTION OF SELECTIVELY ISLANDED MICROGRIDS

BACKGROUND

The field of the disclosure relates to microgrids, and in particular, to protecting microgrids during electrical faults.

A microgrid is a group of interconnected loads and energy sources that operate as a controllable entity with respect to the electric grid. Microgrids can be selectively coupled with the electric grid to operate in grid-connected mode (when the microgrid is electrically coupled with the electric grid) and islanded mode (when the microgrid is electrically uncoupled with the electric grid). In islanded mode, the energy sources of the microgrid supply electrical power to the loads of the microgrid.

During electrical faults at the microgrid, the value of the fault current may vary depending on whether the microgrid operates in grid-connected mode or islanded mode. In grid-connected mode, the electric grid operates as a current source and is capable of supplying high transient currents that are able to trip circuit protection devices in the microgrid during faults. However, in islanded mode, the transient current provided by the energy sources of the microgrid may be significantly less as compared to the current that could be provided by the electric grid, which can make the fault protection design in the microgrid overly complex and/or expensive. For example, the use of intelligent circuit protection devices may be required that vary their trip setpoints depending on whether the microgrid operates in grid-connected mode or islanded mode. Further, the use of intelligent circuit protection devices in microgrids can render the microgrid less reliable due to equipment failures, communication failures, and in some cases, via cyberattacks that target the intelligent circuit protection devices, their communication networks, and/or the control systems that operate the intelligent circuit protection devices.

Thus, it would be desirable to provide mechanisms for microgrids that provide simpler and more robust circuit protection design strategies that do not rely on intelligent current circuit protection devices and their associated more complicated communication and control schemes.

BRIEF DESCRIPTION

In one aspect, a controller for managing electrical faults in a microgrid is provided. The microgrid includes one or more electrical loads, one or more electrical sources, and one or more circuit protection devices that selectively couple the one or more electrical loads and the one or more electrical sources with each other. The controller comprises at least one processor configured to direct a grid tie switch to open to electrically isolate the microgrid from an electric grid, determine, in response to directing the grid tie switch to open, that an electrical fault exits in the microgrid, and determine whether a fault current of the electrical fault is less than a threshold value. The at least one processor is further configured to direct the grid tie switch to close to electrically connect the microgrid to the electric grid and increase the fault current above the threshold value in response to determining that the fault current is less than the threshold value.

In another aspect, a method of managing electrical faults in a microgrid is provided. The microgrid includes one or more electrical loads, one or more electrical sources, and one or more circuit protection devices that selectively couple the one or more electrical loads and the one or more electrical sources with each other. The method comprises opening a grid tie switch to electrically isolate the microgrid from an electric grid, determining, in response to opening the grid tie switch, that an electrical fault exits in the microgrid, and determining whether a fault current of the electrical fault is less than a threshold value. The method further comprises closing the grid tie switch to electrically connect the microgrid to the electric grid and increase the fault current above the threshold value in response to determining that the fault current is less than the threshold value.

In another aspect, a microgrid is provided. The microgrid comprises one or more circuit protection devices, a grid tie switch, and a controller. The one or more circuit protection devices are configured to electrically couple one or more electrical loads and one or more electrical sources with each other when subjected to a fault current from an electrical fault that is less than a trip current level. The one or more circuit protection devices are further configured to electrically decouple the one or more electrical loads and the one more electrical sources from each other when the fault current is greater than the trip current level. The grid tie switch is configured to selectively couple the microgrid with an electric grid. The controller is configured to direct the grid tie switch to open to electrically isolate the microgrid from the electric grid, determine, in response to directing the grid tie switch to open, that the fault current exits in the microgrid, and determine whether the fault current is less than the trip current level. The controller further configured to direct the grid tie switch to close to electrically connect the microgrid to the electric grid and increase the fault current above the trip current level in response to determining that the fault current is less than the trip current level.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings.

Figure 1:
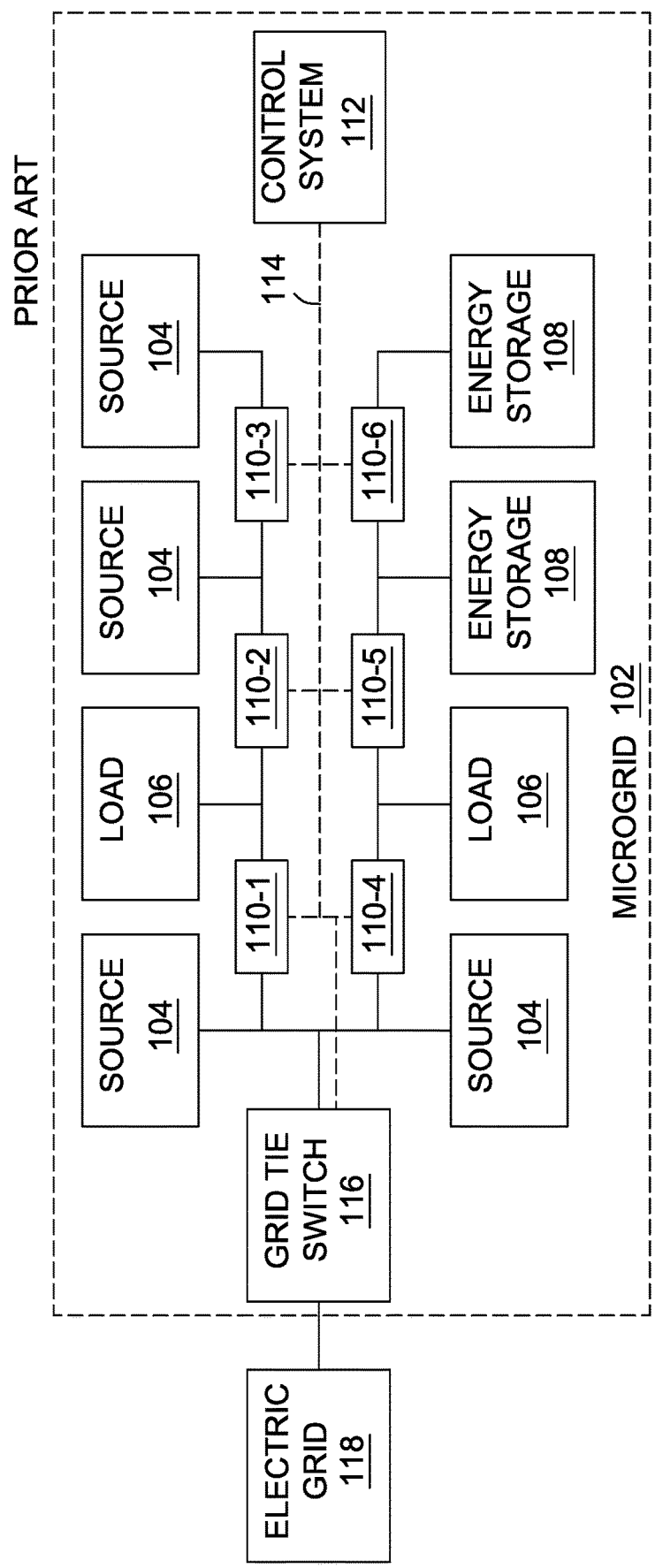
FIG. 1 depicts a block diagram of a known microgrid.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, an analog computer, a programmable logic controller (PLC), an application specific integrated circuit (ASIC), and other programmable circuits, and these terms are used interchangeably herein. In the embodiments described herein, "memory" may include, but is not limited to, a computer-readable medium, such as a random-access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, and a keyboard. Alternatively, other computer peripherals may also be used that may include, for example, but not be limited to, a scanner. Furthermore, in the example embodiment, additional output channels may include, but not be limited to, an operator interface monitor or heads-up display. Some embodiments involve the use of one or more electronic or computing devices. Such devices typically include a processor, processing device, or controller, such as a general-purpose central processing unit (CPU), a graphics processing unit (GPU), a microcontroller, a reduced instruction set computer (RISC) processor, an ASIC, a programmable logic controller (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are not intended to limit in any way the definition and/or meaning of the term processor and processing device.

FIG. 1 depicts a block diagram of a known microgrid 102. Microgrid 102 includes electrical sources 104, electrical loads, 106, and energy storage devices 108, which are selectively coupled with each other by programmable circuit protection devices 110-1, 110-2, 110-3. 110-4, 110-5, 110-6 (referred to collectively as 110). Microgrid 102 further includes a control system 112, which communicates with programmable circuit protection devices 110 via a communication network 114. During operation, control system 112 operates microgrid 102 in islanded mode by directing grid tie switch 116 to open (via communications over communication network 114), which electrically disconnects microgrid 102 from an electric grid 118 (e.g., electric grid 118 may be operated by a utility). Control system 112 may also operate microgrid 102 in grid-connected mode by directing grid tie switch 116 to close (via communications over communication network 114), which electrically connects microgrid 102 to electric grid 118.

In microgrid 102, control system 112 modifies the trip current levels at programmable circuit protection devices 110 (via communications over communication network 114) depending on whether microgrid 102 is operating in grid-connected mode (e.g., grid tie switch 116 is closed) or in islanded mode (e.g., grid tie switch 116 is open). For example, control system 112 may decrease the trip setpoints of programmable circuit protection devices 110 when microgrid 102 operates in islanded mode, as electrical sources 104 and/or energy storage devices 108 may not be able to source sufficient current to trip programmable circuit protection devices 110 when a fault occurs within microgrid 102 as compared to when microgrid 102 operates in grid-connected mode. In a similar manner, for example, control system 112 may increase the trip setpoints of programmable circuit protection devices 110 when microgrid 102 operates in grid-connected mode, as electrical sources 104 and/or energy storage devices 108 in combination with electric grid 118 are capable of sourcing sufficient current during a fault within microgrid 102 in order to trip programmable circuit protection devices 110.

While the use of programmable circuit protection devices 110 are one possible design choice for microgrids, programmable circuit protection devices 110 are expensive as compared to typical circuit breakers and fuses, which have fixed trip current ratings. Further, the use of programmable circuit protection devices 110 in microgrid 102 may render microgrid 102 susceptible to various types of failures. For example, during a failure of control system 112 and/or a failure of communication network 114, microgrid 102 may experience electrical faults that are not handled appropriately (e.g., programmable circuit protection devices 110 may not trip during faults if they are programmed incorrectly when microgrid switches between grid-connected mode and islanded mode). In some cases, these types of failures are due to component failures that would need to be detected and corrected. However, in other cases, these types of failures may be caused intentionally. For example, a cyber-attack on microgrid 102 may intentionally disrupt the operation of control system 112 and/or communication network 114 and/or programmable circuit protection devices 110 in order to damage microgrid 102 and/or damage electric grid 118, which is undesirable.

In the embodiments described herein, more cost effective trip devices (e.g., fuses and/or fixed trip level circuit breakers) are implemented in a microgrid, and when the microgrid is islanded and an electrical fault occurs, the microgrid is electrically re-connected to the grid when the fault current is less than a threshold value to provide additional current to trip the circuit protection devices. For example, the sources of the microgrid may not be able to supply sufficient current when the microgrid is islanded in order to trip the protection devices. In this case, the microgrid is placed back into grid-connected mode, which allows the electric grid to supply sufficient transient current in order to trip the circuit protection devices and clear the fault. Further, the embodiments described herein reduce or eliminate the need for large current capacity energy storage devices to supply sufficient current within an isolated microgrid to clear electrical faults.

Figure 2:
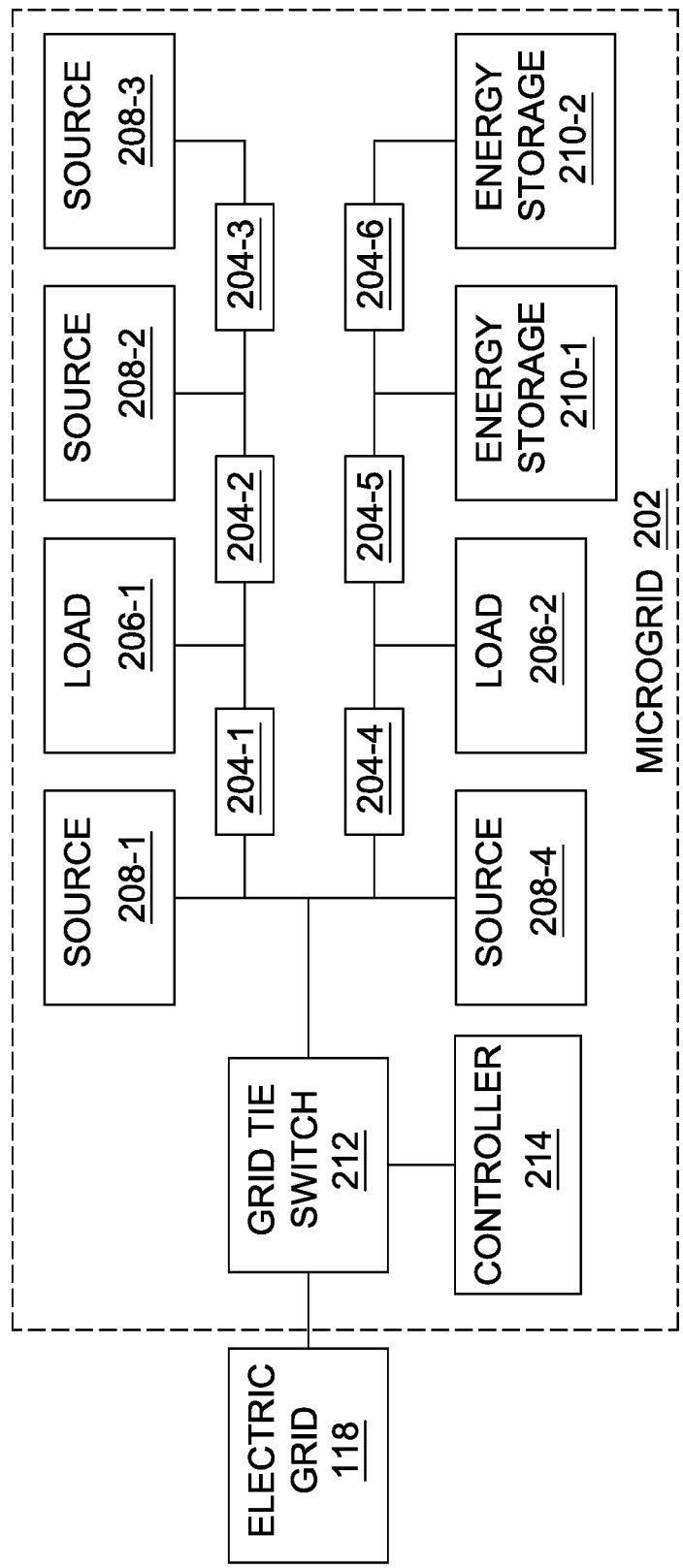
FIG. 2 depicts a block diagram of a microgrid in an exemplary embodiment.

FIG. 2 is a block diagram of a microgrid 202 in an exemplary embodiment. In this embodiment, microgrid 202 comprises one or more circuit protection devices 204, one or more electrical loads 206, one or more electrical sources 208, one or more energy storage devices 210, a grid tie switch 212, and a controller 214. Grid tie switch 212 may comprise one or more solid-state switches, mechanical switches, and combinations thereof. Further, grid tie switch 212 may be operated by controller 214 to selectively open and close.

Circuit protection devices 204 are configured to selectively couple electrical loads 206, electrical sources 208, and energy storage devices 210 with each other. For example, circuit protection devices 204 are configured to electrically couple electrical loads 206, electrical sources 208, and energy storage devices 210 with each other as long as circuit protection devices 204 are subjected to a fault current from an electrical fault that is less than their trip current level, and circuit protection devices 204 are further configured to electrically decouple electrical loads 206, electrical sources 208, and energy storage devices 210 from each other when circuit protection devices 204 are subjected to a fault current from an electrical fault that is greater than their trip current level. Some examples of electrical loads 206 include homes, businesses, industrial plants, etc. Some examples of electrical sources 208 include photovoltaic generators, wind turbines, hydroelectric generators, etc. Some examples of energy storage devices 210 include battery systems, capacitor storage systems, flywheel energy storage system, hydro storage systems, etc. In some embodiments, microgrid 202 does not include energy storage devices 210.

In this embodiment, microgrid 202 is depicted with a specific configuration and number of circuit protection devices 204, electrical loads 206, electrical sources 208, and optionally, energy storage devices 210, although microgrid 202 may have a different configuration and/or a different number of circuit protection devices 204, electrical loads 206, electrical sources 208, and optionally, energy storage devices 210 in other embodiments.

In this embodiment, electrical source 208-1 is selectively coupled with electrical load 206-1 via circuit protection device 204, electrical load 206-1 is selectively coupled with electrical source 208-2 via circuit protection device 204-2, and electrical source 208-2 is selectively coupled with electrical source 208-3 via circuit protection device 204-3. In a like manner, electrical source 208-4 is selectively coupled with electrical load 206-2 via circuit protection device 204-4, electrical load 206-2 is selectively coupled with energy storage device 210-1 via circuit protection device 204-5, and energy storage device 210-1 is selectively coupled with energy storage device 210-2 via circuit protection device 204-6.

In this embodiment, circuit protection devices 204 are configured to selectively open when subjected to a fault current that is higher than their trip current rating, and further configured to conduct the fault current when the fault current is lower than their trip current rating. Circuit protection devices 204 may have the same or similar trip current ratings in some embodiments. In other embodiments, circuit protection devices 204 may have different trip current ratings depending on the topology of microgrid 202, the number and/or expected power draw of electrical loads 206, the number and/or expected power supply rating of electrical sources 208 and energy storage devices 210, etc.

In one embodiment, circuit protection devices 204 comprise fuses that have a current rating, which generate an open circuit and electrically isolate portions of microgrid 202 when subjected to a fault current that is higher than their current rating, and conduct the fault current when the fault current is lower than their current rating. In another embodiment, circuit protection devices 204 comprise circuit breakers having a fixed trip current level, which trip open and electrically isolate portions of microgrid 202 when subjected to a fault current that is higher than their trip current level, and remain closed and conduct the fault current when the fault current is lower than their trip current rating.

When microgrid 202 operates in islanded mode (e.g., grid tie switch 212 is open and microgrid 202 is electrically isolated from electric grid 118) and an electrical fault is present in microgrid 202, electrical sources 208 and energy storage devices 210 may have insufficient source current capability to cause circuit protection devices 204 to open to clear the electrical fault. For example, if electrical sources 208 and energy storage devices 210 have a source current capability that is less than the trip current rating of circuit protection devices 204, then circuit protection devices 204 may not open to clear the electrical fault in microgrid 202 as long as microgrid 202 operates in islanded mode. When microgrid 202 operates in islanded mode and controller 214 determines that (1) a fault current from an electrical fault exists in microgrid 202 and (2) the fault current is less than a threshold level (e.g., the trip current level of circuit protection devices 204), then controller 214 directs grid tie switch 212 to close to electrically connect microgrid 202 with electric grid 118, which increases the fault current above the threshold level (e.g., above the trip current level of circuit protection devices 204) and trips one or more circuit protection devices 204 to clear the electrical fault. In this case, while electrical sources 208 and energy storage devices 210 may have insufficient source current capability to open circuit protection devices 204 and clear the electrical fault while microgrid 202 operates in islanded mode, the additional current supplied by electric grid 118 when microgrid 202 switches back to grid-connected mode is more than sufficient to provide a transient current addition to the fault current that exceeds the trip current level of circuit protection devices 204 and clears the electrical fault in microgrid 202.

In various embodiments, controller 214 may utilize different mechanism in order to determine whether the fault current is less than the threshold value (e.g., the trip current level of circuit protection devices 204), and switch microgrid 202 from islanded mode to grid-connected mode. In one embodiment, microgrid 202 includes various current sensors (not shown), which are used by controller 214 to measure the current in various branches of microgrid 202. The current sensors may, for example, be separate devices in microgrid 202 or included within circuit protection devices 204. In other embodiments, controller 214 determines that the fault current is less than the threshold value (e.g., the trip current level of circuit protection devices 204) using other criteria. For example, controller 214 may determine that the fault current is less than the trip current level of circuit protection devices 204 in microgrid 202 when an electrical fault is detected in microgrid 202, but the appropriate circuit protection device 204 fails to open. In this example, controller 214 may not measure the current directly in the branch of microgrid 202 that is subjected to an electrical fault, but may for example, measure currents in electrical loads 206 and/or electrical sources 208 and/or energy storage devices 210 and/or other branches of microgrid 202 to determine an electrical fault is present but the appropriate circuit protection device 204 has failed to open. In another example, controller 214 may determine that the fault current is less than the trip current level of circuit protection devices 204 when the fault current is approximately equal to the maximum supply current of electrical sources 208 and energy storage devices 210. For instance, controller 214 may detect a surge in the output current of electrical sources 208 and energy storage devices 210 that is about equal to the maximum source current capability of electrical sources 208 and energy storage devices 210, which suggests that, when the combination of electrical loads 206 is significantly less than the maximum output current of electrical sources 208 and energy storage devices 210, that an electrical fault is present in microgrid 202.

In some cases, the electrical fault may be located at grid tie switch 212 and/or at electric grid 118. When the electrical fault is located at grid tie switch 212 and/or at electric grid 118 and microgrid 202 is in grid-connected mode, controller 214 may operate to protect microgrid 202 by directing grid tie switch 212 to open and electrically isolate microgrid 202 from electric grid 118 and/or the electrical fault at grid tie switch 212.

In other cases, the electrical fault may be located in microgrid 202 while microgrid 202 operates in grid-connected mode. In this case, even if electrical sources 208 and energy storage devices 210 are not capable of sourcing sufficient current to trip circuit protection devices 204, electric grid 118 is electrically coupled with microgrid 202 and has sufficient source current capability to increase the fault current above the trip current levels of circuit protection devices 204 and clear the electrical fault.

Figure 3A:
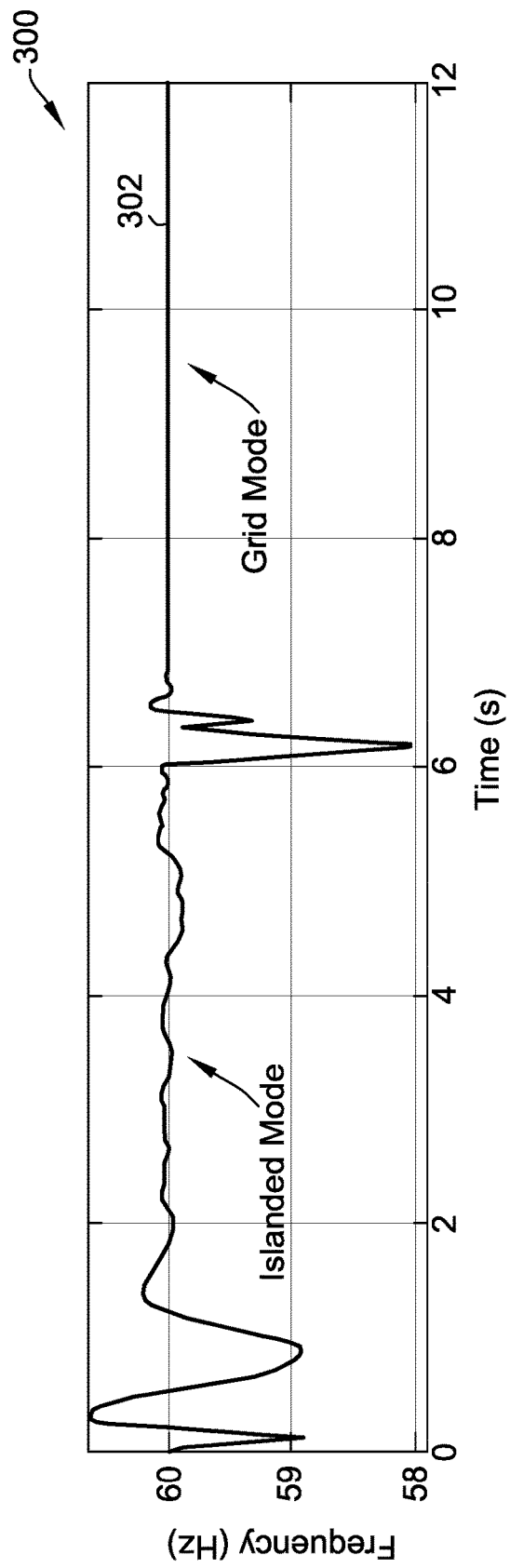
FIGS. 3A-3C are graphs depicting various electrical conditions in a microgrid subjected to an electrical fault in an exemplary embodiment.
Figure 3B:
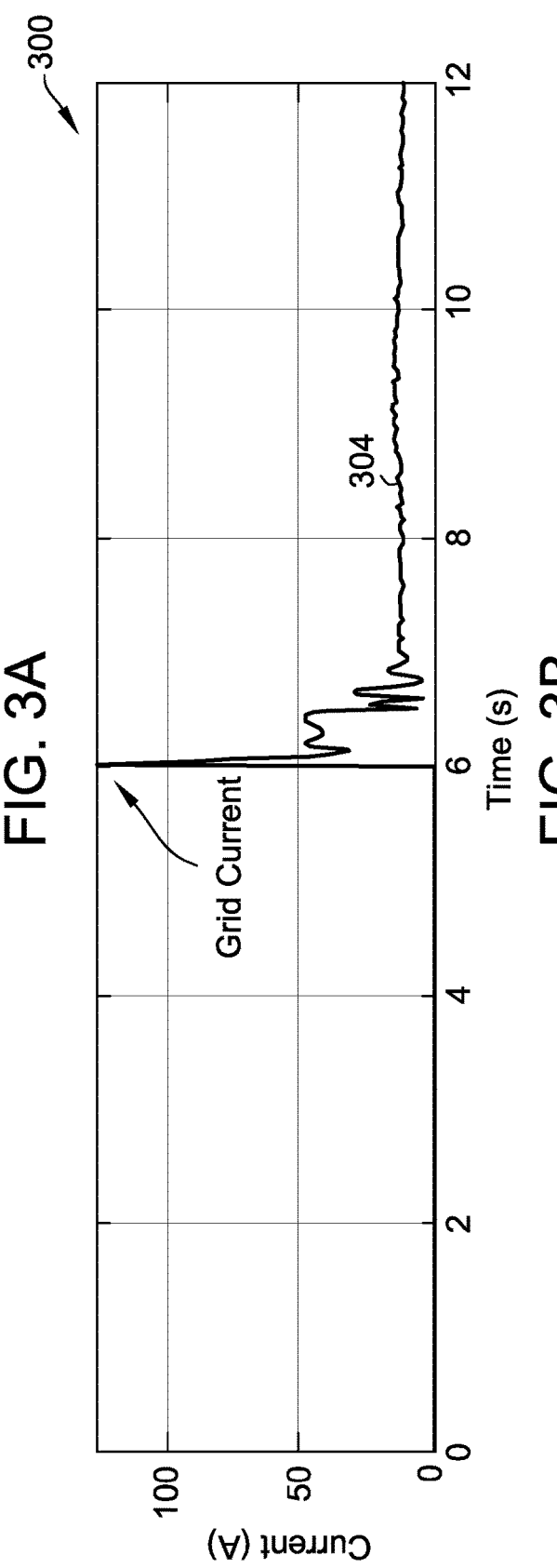
Figure 3C:
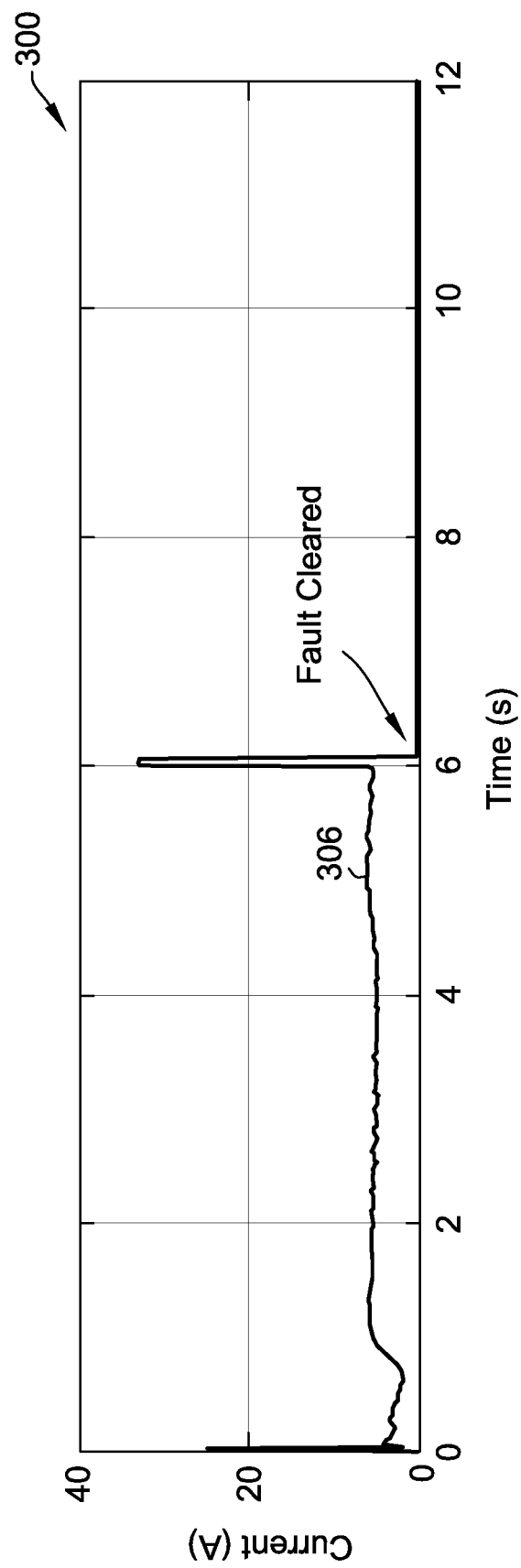

FIGS. 3A-3C are graphs 300 depicting various electrical conditions in a microgrid subjected to an electrical fault in an exemplary embodiment. Graphs 300 generally depict the electrical transitions of a microgrid (e.g., microgrid 202 of FIG. 2) when transitioning from islanded mode to grid-connected mode to clear an electrical fault. FIG. 3A depicts a frequency 302 in the microgrid, FIG. 3B depicts the grid current 304 supplied to the microgrid (e.g., current supplied by electric grid 118 to microgrid 202), and FIG. 3B depicts a source current 306 supplied by the electrical sources and energy storage devices of the microgrid (e.g., the source current supplied by electrical sources 208 and energy storage devices 210 of microgrid 202). In graphs 300, the microgrid operates in islanded mode up to a time of about six seconds. When an electrical fault exists in the microgrid, and the source current 306 is insufficient to trip the circuit protection devices in order to clear the electrical fault (e.g., circuit protection devices 204 may have a trip current setting of about twenty amps, which is greater than the value of source current 306 in FIG. 3C), then the microgrid is switched from islanded mode to grid-connected mode at a time of about six seconds, which allows grid current 304 to operate in conjunction with source current 306 and trip the appropriate circuit protection devices in the microgrid and clear the electrical fault.

Figure 4:
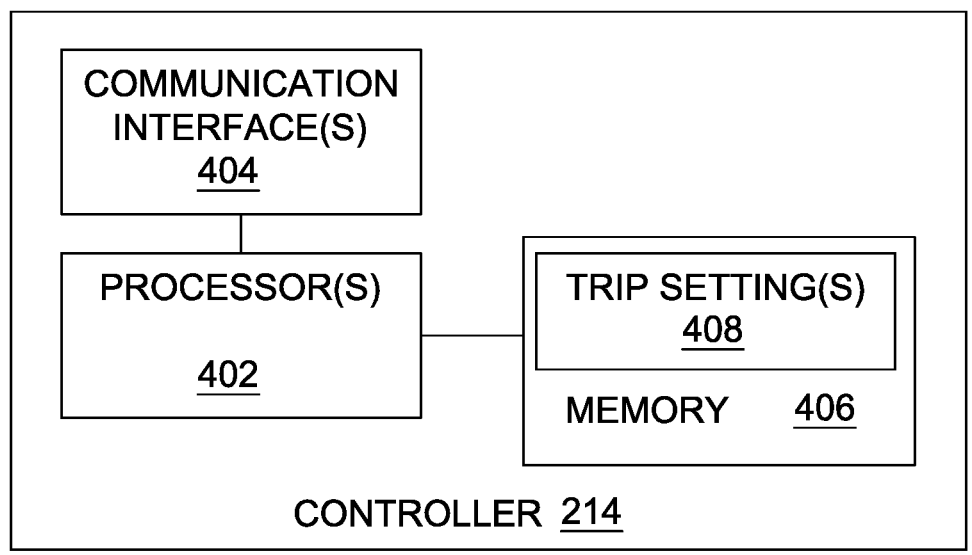
FIG. 4 depicts a block diagram of a controller for managing electrical faults in a microgrid in an exemplary embodiment.

FIG. 4 depicts a block diagram of controller 214 of FIG. 2 in an exemplary embodiment. Controller 214 comprises any component, system, or device that performs the functionality described herein for controller 214. Controller 214 will be described with respect to various discrete elements, which perform functions. These elements may be combined in different embodiments or segmented into different discrete elements in other embodiments. In this embodiment, controller 214 comprises at least one processor 402, at least one communication interface 404, and at least one memory 406. In some embodiments, memory 406 stores one or more trip settings 408 associated with their respective circuit protection devices 204. For instance, controller 214 may be pre-configured with the pre-defined current trip levels associated with circuit protection devices 204, which processor 402 utilizes to determine whether electrical sources 206 have sufficient source current capability to trip circuit protection devices 204 when an electrical fault exists in microgrid 202 and microgrid 202 is operating in islanded mode.

In this embodiment, controller 214 is communicatively coupled with grid tie switch 212 and various electrical sensors, such as current sensors, voltage sensors, frequency sensors, etc., of microgrid 202 via communication interface 404. Communication interface 404 may comprise any wired interface, wireless interface, or combinations thereof, which facilitates the communication of controller 214 with grid tie switch 212 and the sensors operating in microgrid 202.

Figure 5:
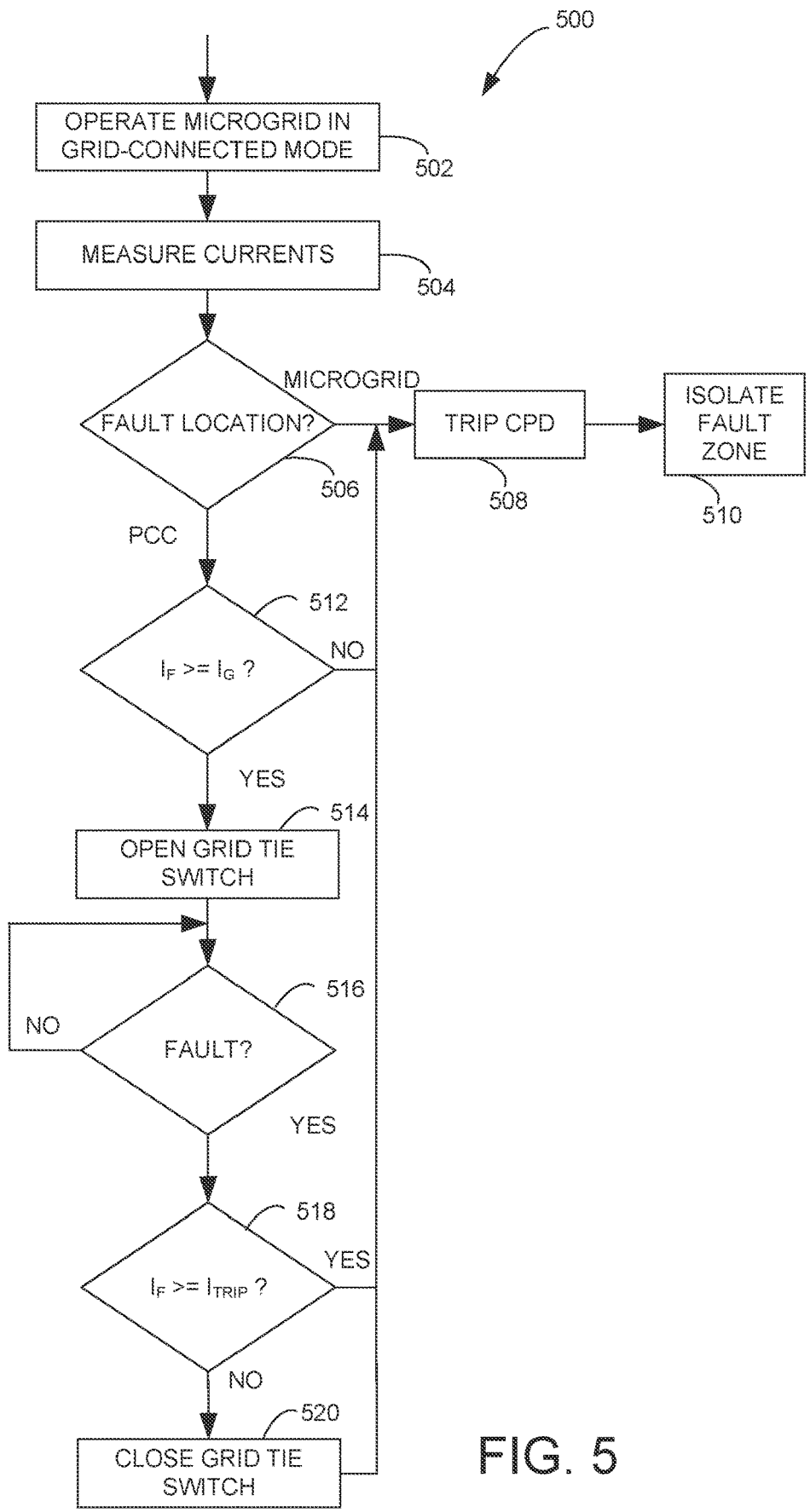
FIG. 5 depicts a flow chart of a method of managing electrical faults in a microgrid in an exemplary embodiment.

FIG. 5 depicts a flow chart of a method 500 of managing electrical faults in a microgrid in an exemplary embodiment. Method 500 will be discussed with respect to microgrid 202 and controller 214 of FIG. 2, although method 500 may be performed by other systems, not shown.

In this embodiment, method 500 comprises operating 502 microgrid 202 in grid-connected mode. For example, controller 214 directs grid tie switch 212 to close, which electrically couples electric grid 118 with microgrid 202.

Method 500 further comprises measuring 504 currents at microgrid 202. For example, controller 214 utilizes current sensors (not shown) to measure the current at various branches within microgrid 202, including currents supplied by electric grid 118 to microgrid 202.

Method 500 further comprises determining 506, in response to an electrical fault, the location of the electrical fault. If the electrical fault is within microgrid 202, then the current from electric grid 118 will ensure that the appropriate circuit protection devices 204 are tripped 508, which will isolate 510 the faulted zone within microgrid 202. If the electrical fault is at the point of common coupling (e.g., at grid tie switch 212), then method 500 further comprises determining 512 if the fault current is greater than or equal to the grid current. If the fault current is less than the grid current, then the grid current will be sufficient to trip 508 the appropriate circuit protection device 204 and isolate 510 the faulted zone (e.g., isolate the faulted grid tie switch 212). However, if the fault current is greater than or equal to the grid current, then method 500 further comprises opening 514 the grid tie switch 212 to electrically isolate microgrid 202 from electric grid 118.

Method 500 further comprises determining 516 if an electrical fault is present in microgrid 202 while microgrid 202 operates in islanded mode. For example, controller 214 may measure various currents within microgrid 202 to identify an electrical fault, may use various criteria previously described to determine if an electrical fault is present in microgrid 202, etc. If an electrical fault is detected, the method 500 further comprises determining 518 if the fault current is greater than or equal to the trip current level of circuit protection devices 204. If the fault current is greater than or equal to the trip current level of circuit protection devices 204, then microgrid 202 has sufficient source current capacity to trip 508 circuit protection devices 204 and isolate 510 the faulted zone withing microgrid 202.

However, if the fault current is less than the trip current level of circuit protection devices 204, then method 500 further comprises closing 520 grid tie switch 212, which electrically couples electric grid with microgrid 202. Electric grid 118 provides additional current to microgrid 202, which increases the fault current above the current trip level of circuit protection devices 204, causing the appropriate circuit protection device 204 to trip 508 and isolate 510 the faulted zone in microgrid 202.

Figure 6:
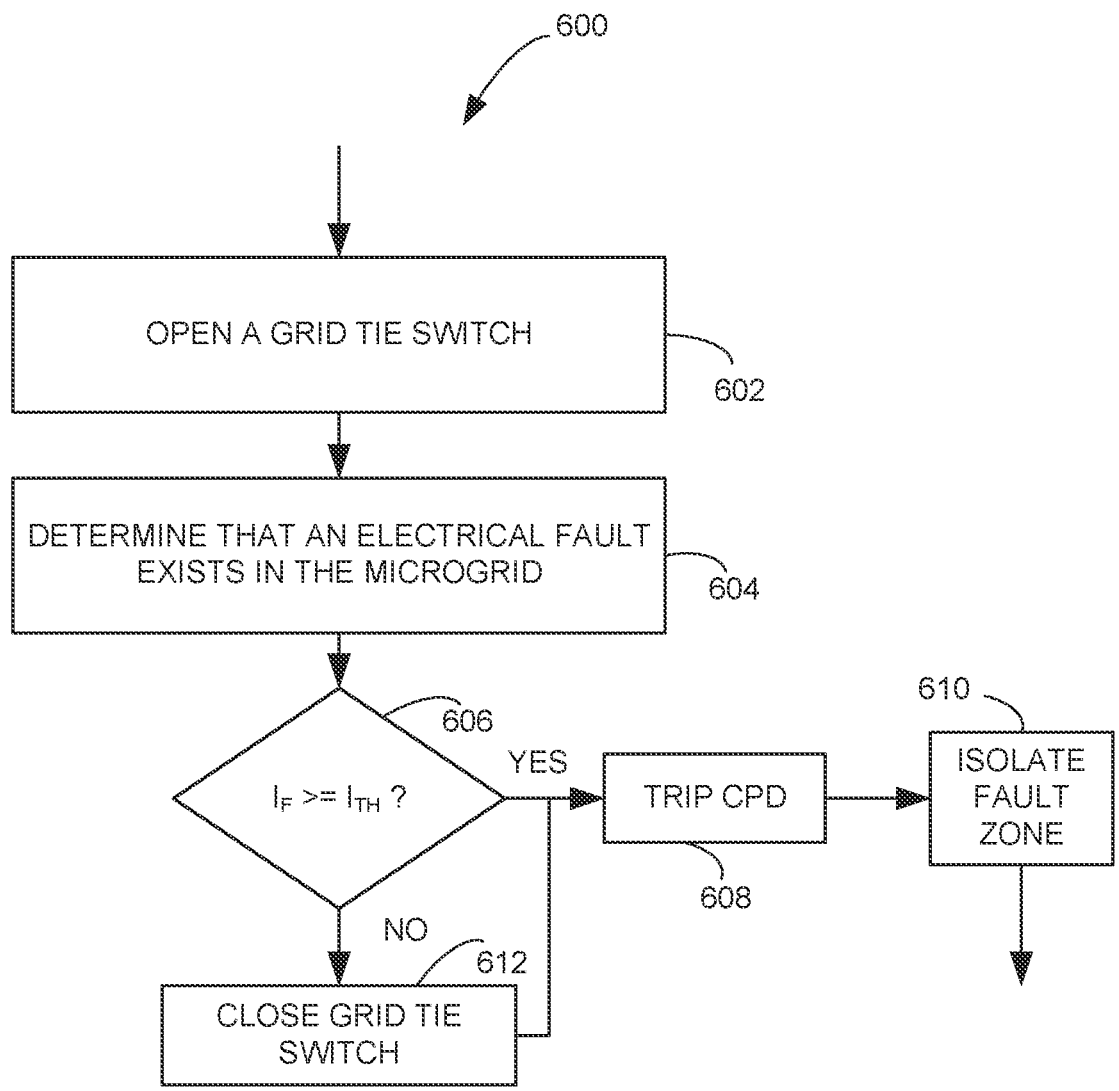
FIG. 6 depicts a flow chart of another method of managing electrical faults in a microgrid in an exemplary embodiment.

FIG. 6 depicts a flow chart of another method 600 of managing electrical faults in a microgrid in an exemplary embodiment. Method 600 will be discussed with respect to microgrid 202 of FIG. 2 and controller 214 of FIGS. 2 and 3, although method 600 may be performed by other systems, not shown.

In this embodiment, method 600 comprises opening 602 a grid tie switch to electrically isolate a microgrid from an electric grid. For example, processor 402 utilizes communication interface 404 to direct or command grid tie switch 212 to open, which electrically isolates microgrid 202 from electric grid 118 (see FIGS. 2 and 4).

Method 600 further comprises determining 604 that an electrical fault exits in the microgrid. In one example, processor 402 utilizes communication interface 404 to read one or more sensors (e.g., current sensors, not shown) in microgrid 202 to determine that an electrical fault exists. In another example, processor 402 utilizes communication interface 404 to read one or more sensors and/or circuit protection devices 204 to determine that one or more of circuit protection devices 204 have failed to open when subjected to the fault current, which suggests that the fault current is less than the trip current level of circuit protection device 204 that is subjected to the fault current. In another example, processor 402 utilizes communication interface 404 to read one or more sensors to determine that the fault current is approximately equal to the maximum supply current of electrical sources 208 and energy storage devices 210, which suggests that the source current capability of microgrid 202 is insufficient to trip circuit protection devices 204.

Method 600 further comprises determining 606 whether the fault current is greater than or equal to a threshold value. In some embodiments, the threshold value may comprise a trip level of one or more of circuit protection devices 204. For example, if circuit protection device 204 subjected to the fault current comprises a fuse, then the trip level may comprise a current rating of the fuse. In another example, if circuit protection device 204 subjected to the fault current comprises a circuit breaker, then the trip level may comprise a trip current level of the circuit breaker. In other embodiments, the threshold value comprises any suitable value that sufficient for controller 214 to determine whether to transition microgrid 202 from islanded mode to grid-connected mode.

If the fault current is greater than or equal to the threshold value, and the threshold value comprises a trip level for circuit protection devices 204, then the source current capability of microgrid 202 is sufficient to trip 608 the appropriate circuit protection devices 204 and isolate 610 the faulted zone of microgrid 202.

However, if the fault current is less than the threshold value, then method 600 further comprises closing 612 the grid tie switch to electrically connect the microgrid to the electric grid and increase the fault current above the threshold value, which operates to trip 608 the appropriate circuit protection devices 204 and isolate 610 the faulted zone of microgrid 202.

An example technical effect of the embodiments described herein includes at least one of: (a) implementing a reduced-cost design for microgrids utilizing lower-cost fixed threshold current interrupter devices; (b) improving the reliability of the microgrid from cyberattacks; and (c) reduce or eliminate the need for large capacity energy storage devices to supply sufficient current within an isolated microgrid to clear electrical faults.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A controller for managing electrical faults in a microgrid, the microgrid including one or more electrical loads, one or more electrical sources, and one or more circuit protection devices that selectively couple the one or more electrical loads and the one or more electrical sources with each other, the controller comprising:
at least one processor configured to:
direct a grid tie switch to open to electrically isolate the microgrid from an electric grid;
determine, in response to directing the grid tie switch to open, that an electrical fault exists in the microgrid;
determine whether a fault current of the electrical fault is less than a threshold value; and
direct the grid tie switch to close to electrically connect the microgrid to the electric grid and increase the fault current above the threshold value in response to determining that the fault current is less than the threshold value.

2. The controller of claim 1, wherein:
the threshold value comprises a trip level of the one or more circuit protection devices.

3. The controller of claim 2, wherein:
the one or more circuit protection devices comprise one or more fuses, and
the threshold value comprises a current rating of the one or more fuses.

4. The controller of claim 2, wherein:
the one or more circuit protection devices comprise one or more circuit breakers, and
the threshold value comprises a trip current level of the one or more circuit breakers.

5. The controller of claim 1, wherein:
the at least one processor is further configured to determine that the fault current is less than the threshold value in response to the one or more circuit protection devices failing to open when subjected to the fault current.

6. The controller of claim 1, wherein:
the at least one processor is further configured to determine that the fault current is less than the threshold value in response to a determination that the fault current is approximately equal to a maximum supply current of the one or more electrical sources.

7. The controller of claim 1, wherein:
the electric grid comprises a utility electric grid.

8. A method of managing electrical faults in a microgrid, the microgrid including one or more electrical loads, one or more electrical sources, and one or more circuit protection devices that selectively couple the one or more electrical loads and the one or more electrical sources with each other, the method comprising:
opening a grid tie switch to open to electrically isolate the microgrid from an electric grid;
determining, in response to opening the grid tie switch, that an electrical fault exists in the microgrid;
determining whether a fault current of the electrical fault is less than a threshold value; and
closing the grid tie switch to open to electrically connect the microgrid to the electric grid and increase the fault current above the threshold value in response to determining that the fault current is less than the threshold value.

9. The method of claim 8, wherein:
the threshold value comprises a trip level of the one or more circuit protection devices.

10. The method of claim 9, wherein:
the one or more circuit protection devices comprise one or more fuses, and
the threshold value comprises a current rating of the one or more fuses.

11. The method of claim 9, wherein:
the one or more circuit protection devices comprise one or more circuit breakers, and
the threshold value comprises a trip current level of the one or more circuit breakers.

12. The method of claim 8, wherein determining whether the fault current of the electrical fault is less than the threshold value further comprises:
determining that the one or more circuit protection devices fail to open when subjected to the fault current.

13. The method of claim 8, wherein determining whether the fault current of the electrical fault is less than the threshold value further comprises:
determining that the fault current is approximately equal to a maximum supply current of the one or more electrical sources.

14. The method of claim 8, wherein:
the electric grid comprises a utility electric grid.

15. A microgrid, comprising:
one or more circuit protection devices configured to:
electrically couple one or more electrical loads and one or more electrical sources with each other when subjected to a fault current from an electrical fault that is less than a trip current level; and
electrically decouple the one or more electrical loads and the one or more electrical sources from each other when the fault current is greater than the trip current level;
a grid tie switch configured to selectively couple the microgrid with an electric grid; and
a controller configured to:
direct the grid tie switch to open to electrically isolate the microgrid from the electric grid;
determine, in response to directing the grid tie switch to open, that the fault current exists in the microgrid;
determine whether the fault current is less than the trip current level; and
direct the grid tie switch to close to electrically connect the microgrid to the electric grid and increase the fault current above the trip current level in response to determining that the fault current is less than the trip current level.

16. The microgrid of claim 15, wherein:
the one or more circuit protection devices comprise one or more fuses, and
the trip current level comprises a current rating of the one or more fuses.

17. The microgrid of claim 15, wherein:
the one or more circuit protection devices comprise one or more circuit breakers.

18. The microgrid of claim 15, wherein:
the controller is further configured to determine that the fault current is less than the trip current level in response to the one or more circuit protection devices failing to open when subjected to the fault current.

19. The microgrid of claim 15, wherein:
the controller is further configured to determine that the fault current is less than the trip current level in response to a determination that the fault current is approximately equal to a maximum supply current of the one or more electrical sources.

20. The microgrid of claim 15, wherein:
the electric grid comprises a utility electric grid.

* * * * *